Jan. 17, 1956   R. R. BLOSS   2,730,795
WIRE LINE SHEAVE AND METHOD OF FABRICATION
Filed Feb. 6, 1951   8 Sheets-Sheet 1

RICHARD R BLOSS
INVENTOR.

BY Lester B Clark.

ATTORNEY

Jan. 17, 1956 R. R. BLOSS 2,730,795
WIRE LINE SHEAVE AND METHOD OF FABRICATION
Filed Feb. 6, 1951 8 Sheets-Sheet 2

RICHARD R. BLOSS.
INVENTOR.

BY Lester B. Clark.
ATTORNEY

Jan. 17, 1956  R. R. BLOSS  2,730,795
WIRE LINE SHEAVE AND METHOD OF FABRICATION
Filed Feb. 6, 1951  8 Sheets-Sheet 3

RICHARD R BLOSS
INVENTOR.

BY Lester B Clark.

ATTORNEY

Jan. 17, 1956 R. R. BLOSS 2,730,795
WIRE LINE SHEAVE AND METHOD OF FABRICATION
Filed Feb. 6, 1951 8 Sheets-Sheet 4

Richard R. Bloss
INVENTOR.

BY Wm. E. Ford

ATTORNEY

Richard R. Bloss
INVENTOR.

BY Wm. E. Ford

ATTORNEY

Jan. 17, 1956 R. R. BLOSS 2,730,795
WIRE LINE SHEAVE AND METHOD OF FABRICATION
Filed Feb. 6, 1951 8 Sheets-Sheet 7

Richard R. Bloss
INVENTOR.

BY Wm. E. Ford
ATTORNEY

Jan. 17, 1956 R. R. BLOSS 2,730,795
WIRE LINE SHEAVE AND METHOD OF FABRICATION
Filed Feb. 6, 1951 8 Sheets-Sheet 8

Richard R. Bloss
INVENTOR.

BY Wm. E. Ford

ATTORNEY

United States Patent Office 2,730,795
Patented Jan. 17, 1956

2,730,795
WIRE LINE SHEAVE AND METHOD OF FABRICATION

Richard R. Bloss, Beaumont, Tex., assignor to Dresser Equipment Company, Beaumont, Tex., a corporation of Ohio Application February 6, 1951, Serial No. 209,680

4 Claims. (Cl. 29—159)

The invention relates to a wire line sheave and the fabrication thereof where such sheave is to be used to support tremendous loads to be moved by a wire line. Specifically the invention may be utilized in the sheaves of the blocks of an oil field derrick and drilling rig assembly.

In the past, considerable difficulty has been encountered with the cast type of sheave which is usually provided for the blocks of a drilling rig. One of the principal difficulties resides in the fact that the cast metal type of sheave having a rim, hub and circumferentially disposed spokes concentrates the load over the outer end of the spoke where the rim crosses the end thereof. As a result in many instances the rim may take on a flattened contour at its periphery between spokes and such deformation of the sheaves is particularly noticeable. It has also been found that such a cast type of sheave is subjected to cracking because of the stresses in the metal, and since the depth of the wells and consequently the load on the derrick and the block sheaves has substantially increased in recent years, it is believed that the present invention constitutes a substantial improvement in the means and method of fabricating, in particular both the crown and traveling block sheaves of a drilling rig.

It is one of the objects of the present invention to fabricate a sheave from three pieces which are integrated together as a unitary device comprising the rim, the web, and the hub.

It is one object of the invention to roll-forge a sheave rim from a flat sheet of alloy steel so as to incorporate therewith an annular web into which is fitted the bearing hub of the sheave.

Another object of the invention is to fabricate a sheave by roll-forging the rim to a predetermined and desired shape and configuration so that the web portion may be inserted and welded in position in the rim after the rim has been formed to the desired size and shape.

Another object of the invention is to provide a sheave with a hub fitted into a solid webbed plate of uniform and homogeneous cross section.

Another object of the invention is to provide a completed sheave which is inherently balanced both dynamically and statically because of the method of fabrication thereof.

Another object of the invention is to create a sheave rim of a band of sheet material which is heated and roll-forged into the final cross section of wire line tread or groove by circumferential rolling so as to arrange the grain structure in the sheave rim into a series of concentric circles having much the same form as a bundle of minute wires each of which is parallel to the others and concentric with the sheave rim.

A still further object of the invention is to provide the tread portion of a rotatable sheave as a groove formed in a roll-forged rim which may be heat treated and flame hardened to a relatively high brinell hardness so as to furnish substantial and uniform service.

A still further object of the invention is to stress relieve the sheave to avoid cracking and to provide a uniform grain structure.

A still further object of the invention is to provide a uniformly round sheave rim even under excessive load conditions because the rim is uniformly supported by a solid web.

It is an object of the invention to provide a means and method of forming web-tight roll-forged sheaves which are capable of supporting concentrated wire line loads and which are free from shrink pockets and sand holes frequently encountered in cast type sheaves.

It is also an object of the invention to provide a method of fabricating such sheaves as are herein disclosed.

A still further object of this invention is to provide a sheave with lightening hole means in the web so provided so to leave the sheave in both dynamic and static balance.

Other and further objects of the invention will be readily apparent when the following description is considered in connection with the accompanying drawings wherein.

The inside edge of Fig. 5 is different than the outer periphery because each the hub and the web are formed with depth surfaces which may be inter-fitted to provide a rigid structure whose arrangement is such that the positioning of the web on a hub is predetermined by an off-set or shoulder construction.

As is apparent, the sheave is made up to three portions, the hub, the web, and the rim. Each of these parts is made separately and then the three assembled or integrated together by welding in order to insure proper balance and accuracy and a sheave which will perform under satisfactory working conditions.

The hub is in the form of an annular member which is fitted into an opening in the annular web plate so that the web may be affixed to the hub and the web in turn is fitted into the grooved rim or sheave portion so that the rim and its tread or wire line supporting groove will be accurately positioned upon the web and so that the wire line will be uniformly supported on the web as distinguished from the spaced radial spoke support with the cast type of sheave.

Figure 2:
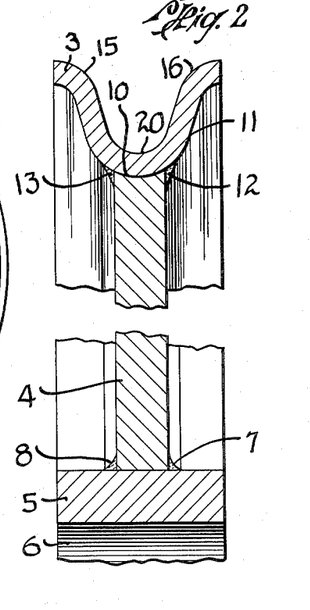
Fig. 2 is a section taken on the line 2—2 of Fig. 1 and illustrating the cross sectional arrangement of the hub, web, rim, and affixing weld beads.

It seems evident from Fig. 2 that the hub, web, and sheave have been welded together preferably by an automatic welding machine which will deposit one or more beads at the junction of the web and hub and at the junction of the web and the inside face of the rim. In this manner, it may be said that the three parts are integrated together as a permanent structure. It seems obvious also that in event of wear on either the rim or the hub, the sheave may be dismantled by cutting the beads of welding material and then replacing either the rim, web, or hub as the circumstances may require.

It is believed that the invention will be best understood by reciting a sequence of steps which constitute the method of fabrication of the unit by forming the different elements and then assembling the elements together to provide the finished product of commerce. It is submitted that sheaves constructed exactly in accordance with the present disclosure have been made, used and found to be exceptionally satisfactory in actual practice.

The method embodies the following procedure of taking a flat rectangular strip of sheet metal 101 of the desired thickness to form the rim of the sheave. This strip of metal is constructed of a predetermined length and width and thickness, as shown in Figs. 12 and 13, depending upon the size and strength of the sheave which is to be fabricated.

Figures 12, 13, 14:
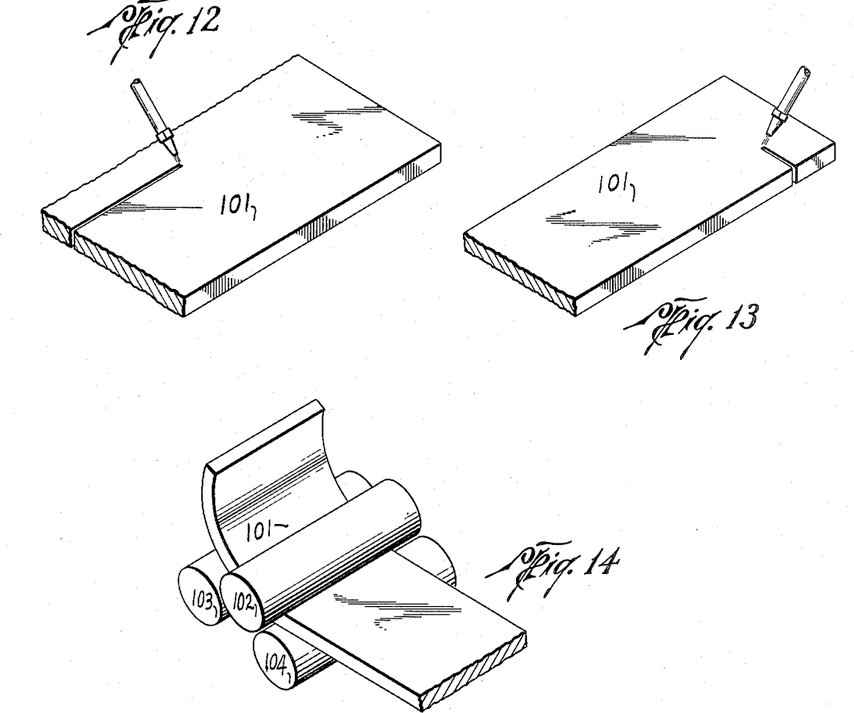
Fig. 12 shows the step of cutting out the flat sheet from which the rim is formed.
Fig. 13 shows the step of squaring the ends of the sheet with its edges.
Fig. 14 shows the step of rolling the flat sheet into a rim.
Figure 15:
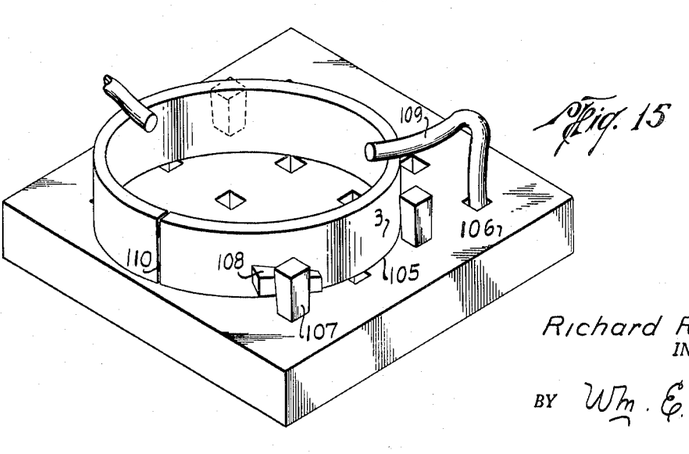
Fig. 15 shows the step of positioning the rim on a flat slab to align the edge in the same plane.

The ends of this rectangular strip of metal 101 are squared with the edges and the strip is then cold formed between the rollers 102, 103, and 104, as shown in Fig. 14, into a circular band on a bending roll or other suitable machine. This band is then positioned on edge 105 on a flat slab surface 106 and temporarily affixed to such flat surface so that all points of the said edge are brought into contact with the slab and are thus lying in the same plane and with the rim formed and shimmed into position, by the shims 107, 108, and hold down dogs 109, so that it constitutes a circular ring 3 having a uniform and predetermined circumference throughout. The band is then tack welded, as at 110, to hold it in this form.

Figure 16A:
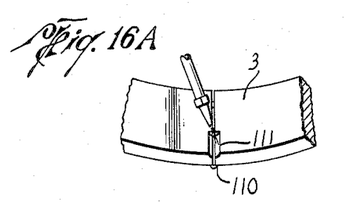
Figs. 16A, 16B, 16C, and 16D show the successive steps of welding the rim ends together with a through weld.
Figure 16B:
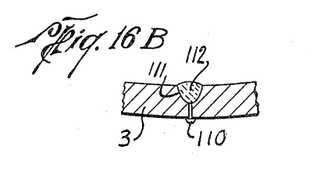

The abutting ends of this circular ring 3 on the inside circumference are then beveled along the adjacent edges, as shown in Figs. 16A and 16B, by creating a groove 111 which penetrates substantially one-half of the thickness of the rim. This provides a V-shaped, grooved space for the deposit of the weld material so as to obtain a homogeneous deposit of weld metal 112 from the inside toward the outside of at least one-half of the thickness of the ring material. In this manner a proper bond is obtained between the weld metal and the rim metal so as to form a uniform joint.

Figure 16C:
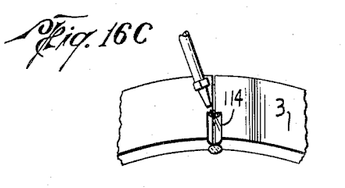
Figure 16D:
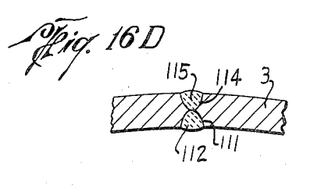

After the inside weld has been completed the abutting edges of the joint on the outside of the ring are then beveled at 114, as shown in Fig. 16C, in the manner described in connection with the inside edges. This groove is carried from the outside of the ring toward the inside to sufficient depth to insure that the rim material is removed down and the inside weld and thus insure a homogeneous weld when welding material 115 is deposited in this outside groove. In this manner, as shown in Fig. 16D, a 100% penetration of weld metal entirely through the rim is insured.

Figures 17, 18:
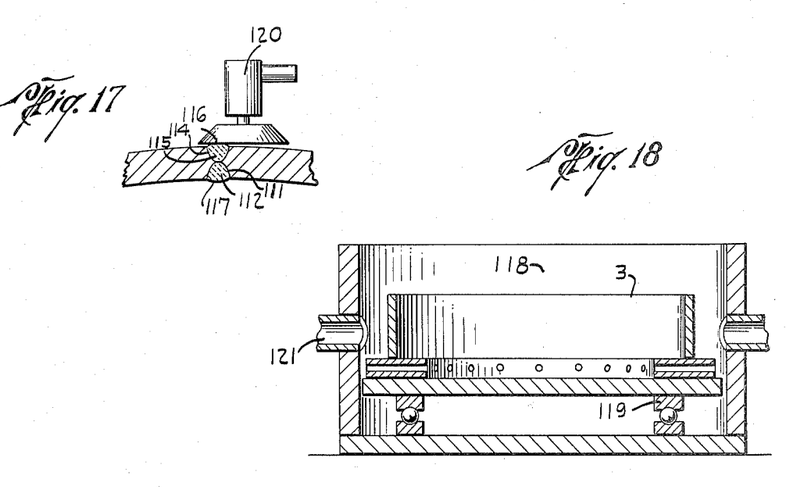
Fig. 17 shows the step of grinding the through weld.
Fig. 18 shows the step of positioning the rim to be rotated and heated.
Figure 19A:
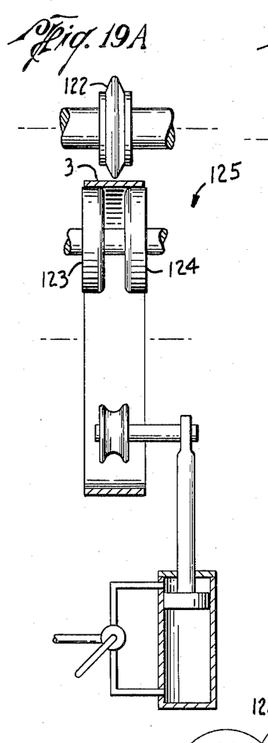
Figs. 19A, 19B, and 19C show the successive steps of roll forging the rim.
Figures 19B, 19C:
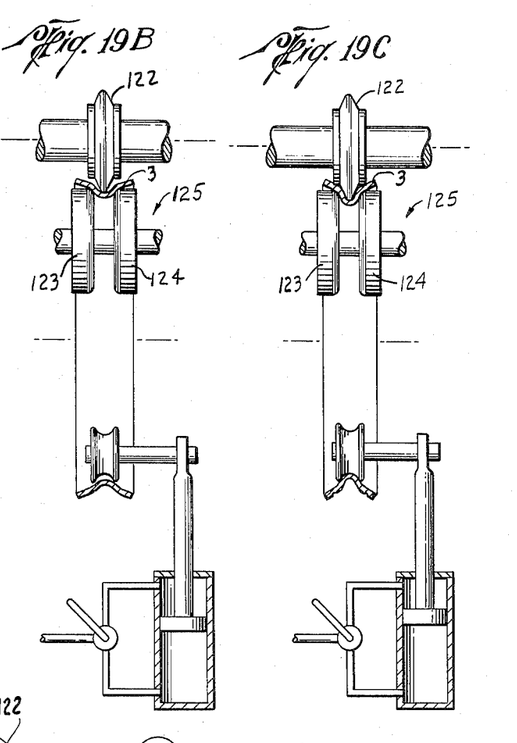

The welded annular cylindrical band is now subjected to grinding as shown in Fig. 17, by the grinder 120, both on the inside and outside faces 116 and 117, respectively, so as to provide a rim of uniform circumferential thickness.

The next step is to place this cylindrical ring in a heating furnace 118, preferably one with a rotating bottom 119, as shown in Fig. 18, so that the rim is revolved while it is being heated. This insures even heating of the ring and relieves stresses from previous rolling and welding operations.

When the rim 3 has been uniformly heated through the jets 121 to a predetermined temperature which approximates a critical heat for the character of the metal, the heated ring is removed from the furnace and placed in a suitable roll-forging machine 125, as shown in Figs. 19A, 19B, 19C and 20, where the adjustment and movement of the dies 122, 123 and 124 are accurately controlled so that the rotating dies cause the rim 3 to roll therebetween and the ring is gradually deformed from the cylindrical rim which was first formed to a grooved rim structure, generally following the configuration of the rim in Fig. 2 and the other figures of the drawings.

The rolling of the red hot metal between the adjustable dies serves to roll-forge the wire line groove so as to set up a circumferential grain structure in the metal due to the circumferential pull and force caused by the rolling of the rim.

Figure 20:
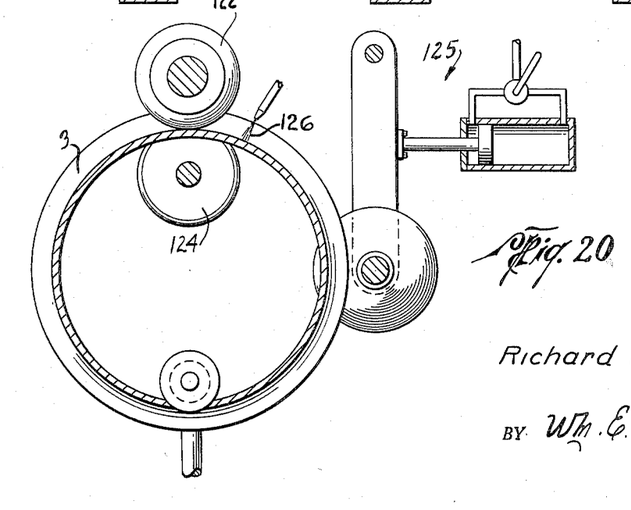
Fig. 20 is a side sectional elevation of the step shown in Fig. 19C.
Figure 21:
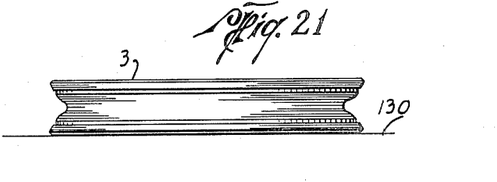
Fig. 21 shows the step of positioning the roll forged rim on edge on a flat slab to avoid bending or distortion as it cools.

It is preferred during the roll-forging operation that a small stream of water 126, as shown in Fig. 20, be directed just in front of the dies which form the wire groove in the sheave momentarily cooling the metal as it rolls under the die. This allows the ring to be formed with a maximum thickness of metal under the grooving dies. In addition the water keeps the dies cool and at the same time pops off any scale that has been formed while heating the rim due primarily to a sudden differential in temperature between the rim metal and the scale. If this scale is not removed, it is rolled in the metal under the die and gives a rough finish groove. When the rim has been rolled to the correct contour and configuration as indicated by the adjustment of the dies, it is laid on the bending slab 130 for cooling. This is very carefully done to avoid deforming the rim since it is still hot. The ring is now free from stresses due to the fact that it has been formed while hot.

Figure 22:
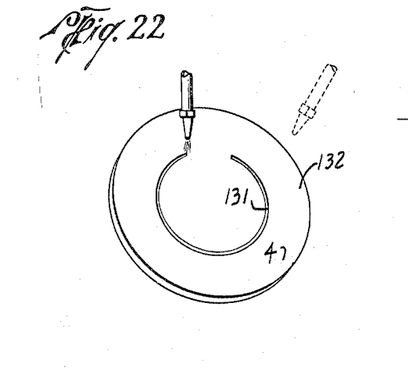
Fig. 22 shows the step of cutting the annular web.
Figure 24B:
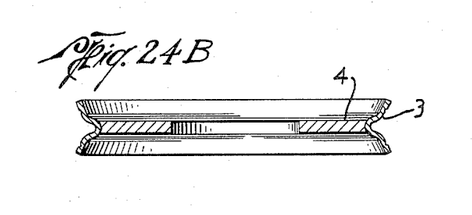
Fig. 24B shows the step whereby the cooled rim contracts upon the web.
Figure 25:
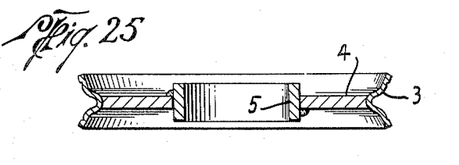
Fig. 25 shows the step of fitting the hub by tack welding into the web.

An annular web 4, as shown in Fig. 22, with a central opening 131 to receive a hub, is formed from a flat sheet of metal plate 132 of the desired thickness calculated to support the load for which the sheave is designed. The plate is cut then fitted into the inner periphery of the rim so that the central plane of the web 4 and the central plane of the rim 3 are coincidental as shown in Fig. 24B. A hub 5 which has been separately formed is fitted centrally into the web of the sheave as shown in Fig. 25 so that in this manner there is an assembling of the rim, web, and hub.

Figure 23:
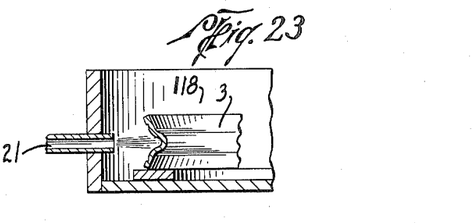
Fig. 23 shows the step of heating the rim so that the web may fit therein.
Figure 24A:
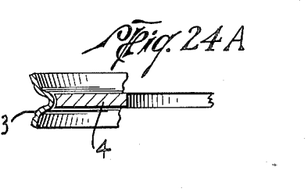
Fig. 24A shows the step of placing the web within the heated rim.

If desired, the rim may be reheated, as shown in Fig. 23, to a sufficient temperature whereby the resulting expansion will allow it to be passed over the periphery of the web as shown in Fig. 24A, because in some forms, as seen in Fig. 2, the periphery of the web may be concave so as to fit the convex surface of the base of the rim. This additional heating serves to further stress relieve the rim.

Figure 31:
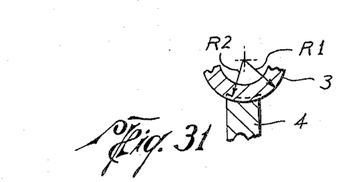
Fig. 31 shows the proportions of web and rim whereby rim shrinkage after expansion achieves a positive fit.

In actual practice, the radius R1 of the inside base of the rim, as shown in Fig. 31, may be greater than the radius R2 of the concave groove which is the periphery of the web. In this manner, the parts will fit snugly together when the rim cools and shrinks onto the outer periphery of the web plate. This is merely one form of shrinking the rim onto the web.

Figure 27:
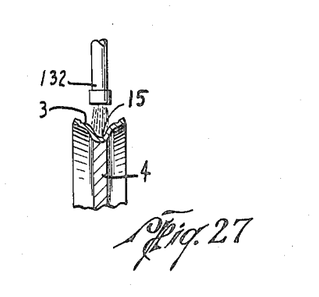
Fig. 27 shows the step of blasting the rim to remove scale therefrom.

Any scale which may have been formed in the rim groove 15 is now resumed, as by the sandblast 132, as shown in Fig. 27.

Figure 26:
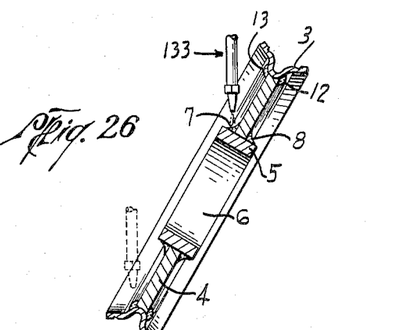
Fig. 26 shows the step of welding the hub to the web.

A suitable automatic welding machine 133 for depositing a uniform weld, as shown in Fig. 26, is used so as not to upset the balance of the already naturally balanced parts.

Figure 28:
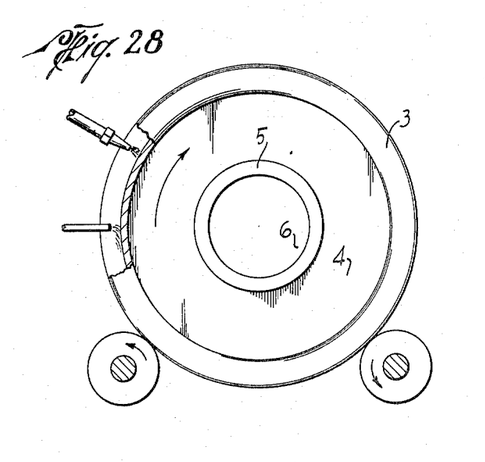
Fig. 28 shows the step of flame hardening the sheave.
Figure 29A:
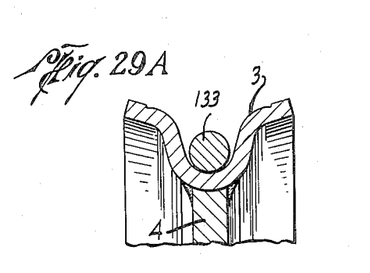
Figs. 29A and 29B show the step of using a "go" and "no-go" gage in sheave fabrication.
Figure 29B:
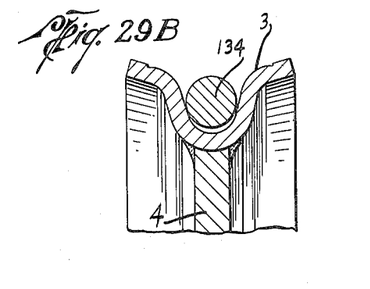

The tread or wire line groove in the rim may be flame hardened if desired, as shown in Fig. 28, and in actual practice it has been found that a brinell hardness of approximately 500 is satisfactory. The shape of the groove is tested by a "go" gauge 133 and "no go" gauge 134 for correct profile as shown in Figs. 20A and 29B.

Figure 30:
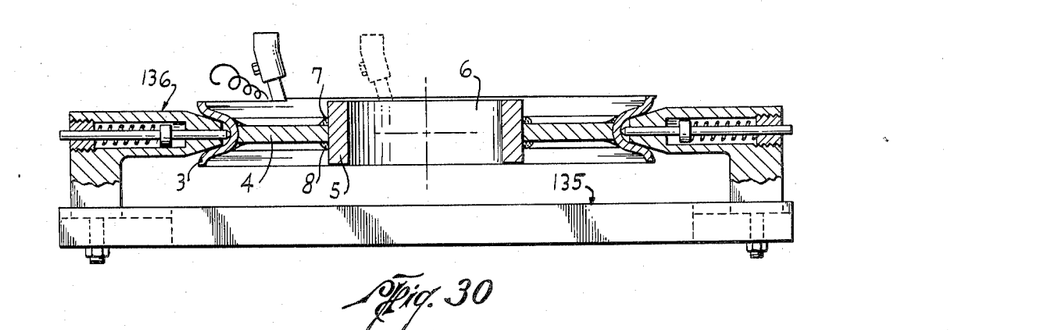
Fig. 30 shows the step of machining the rim.

The sheave is now mounted in a suitable boring mill 135, as shown in Fig. 30, and is centered in a jig fixture 136 to clamp the sheave by the tread or wire line formed groove 15 so that the sheave may be machined with reference to the root diameter of the tread of the groove and the bore 6 of the hub is then turned so that it is normal or perpendicular to the plane of the root diameter and perpendicular to the web plate.

When a sheave is formed as hereinbefore described, it has been found that if careful manufacturing tolerances are maintained the sheave is dynamically and circumferentially balanced. No further balancing is necessary when the sheave is used commercially, such as in derrick crown and traveling blocks.

Figure 1:
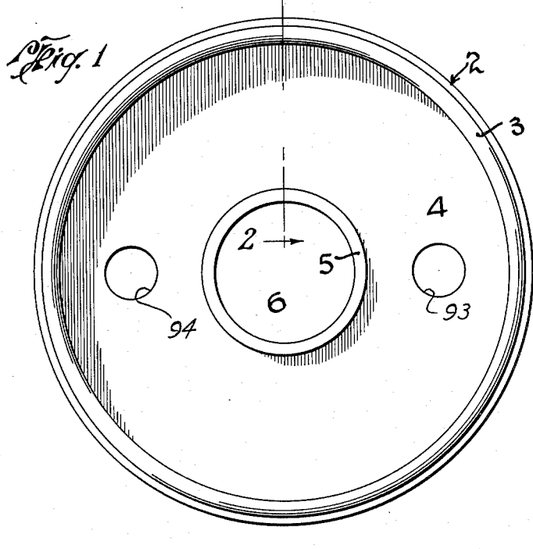
Fig. 1 is a side elevation of a completed sheave made up of the hub, rim, and web as an integrated unit capable of supporting tremendous loads.

Reference may be made to the drawings wherein Figures 1 and 2 represent the sheave generally as having been made up of the rim 3, the web 4, and hub 5. The hub has the simple opening 6 therein which will receive the shaft on which the sheave will be mounted. In Fig. 2 the sub is shown as being in the form of a cylindrical member which has had the web plate 4 slipped axially therealong to the proper position. Then the beads 7 and 8 of welding material are positioned as hereinbefore described.

This web 4 may be grooved at its periphery at 10 if desired and as seen in Fig. 2 so as to form a seat or support for the rim 3 in the fabrication of the sheave.

This groove 10 may be machined or otherwise formed and is arranged to receive the base portion 11 of the rim 3 so that the rim will be suitably affixed by the weld metal 12 and 13 disposed at each side.

Particular attention is directed to the peculiar configuration of the outer surface 15 of the rim where a reverse curve is provided at 16 to merge the two outer surfaces or peripheries of the opposite sides of the rim with the wire line groove 20 or tread which is to receive the wire line when the sheave is in actual use.

It is important that this tread or groove be of uniform configuration and of a size to receive the wire line without friction and wear and so that the wire line will be positively and uniformly supported throughout its engagement with the sheave to avoid distortion of the wire line and to avoid wear on the sheave.

As indicated hereinbefore, the radius of the groove 10 and the radius of the surface 11 may be slightly different so as to shrink the rim into position on the web and, of course, the web may be slightly over-size by a predetermined amount so as to accommodate the sheave rim when it is to be shrunk into position.

Figure 3:
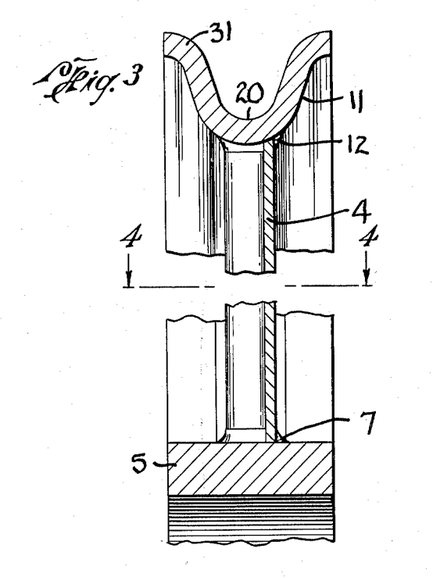
Fig. 3 shows a section such as taken along the line 2—2 of Fig. 1 but showing a modified form of web which constitutes a circular radially corrugated web structure.
Figure 4:
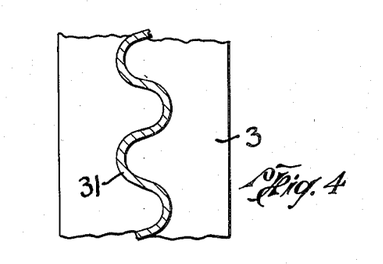
Fig. 4 is a transverse section taken on the line 4—4 of Fig. 3 to show the exact arrangement of the corrugated web of the sheave.

Fig. 3 shows a modified arrangement wherein the web 4 is in the form of a corrugated annular ring provided with the corrugations 31 as seen in Fig. 4. This web 4 will be welded in the hub 5 and the sheave rim 30 as heretofore described.

Figure 5:
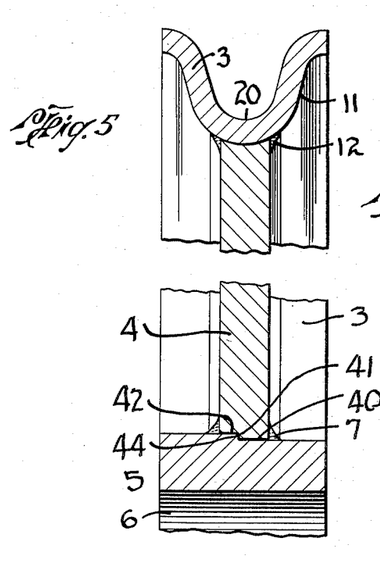
Fig. 5 is a section such as taken on the line 2—2 of Fig. 1 but illustrating a slightly modified form of the web, hub and rim where the outer periphery of the web has been circumferentially grooved or dished in order to fit a substantially cooperating inside face of the sheave rim so that the rim and outer web periphery may be affixed together to provide a rigid structure and in a predetermined relationship relative to the sheave groove and the center of the web plate.

In Fig. 5, the hub 5 and web 4 have been assembled with the rim 3 as described in connection with Fig. 2 except the inner surface 40 of the web 4 has been machined to provide a shoulder 41 and a slightly enlarged opening 42 which constitutes a step arrangement to receive a complementary step arrangement 44 in the hub 5. One advantage of this construction is that the positioning of the step between the parts insures accurate and balanced position of the web relative to the hub so that when the sheave is accurately positioned and balanced on the periphery of the web a completed and accurately arranged sheave will be provided.

Figure 6:
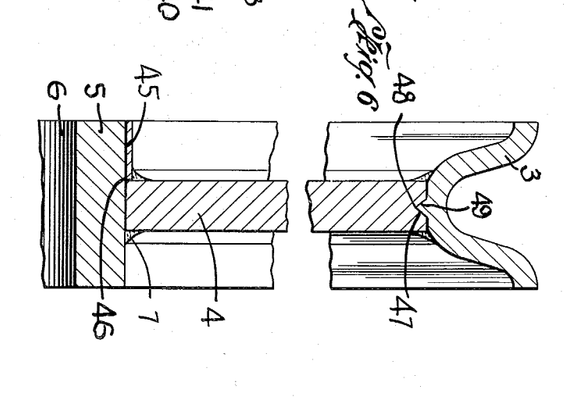
Fig. 6 shows still another modified arrangement where the outer periphery of the web and the inner periphery of the rim have cooperating inner engaging grooves and rib faces to insure the accurate positioning of the web and the rim together, whereas the inner portion of the web adjacent the hub is such that a spacer plate may be provided to insure the proper positioning of the web.

Fig. 6 shows another modified arrangement of web 4. A spacer rim or band 45 is positioned on the periphery of hub 5 so that web 4 may be disposed thereagainst as at 46 to insure accurate positioning of the web on the hub.

The outer periphery 47 of the web is shown as having been grooved at 48 to receive the rib or bead 49 of the rim 3. With this arrangement, the rim may be heated and expanded so as to be deposited over the web and upon cooling the rib 49 will shrink into the groove 48 so as to insure accurate positioning of the parts.

Figure 7:
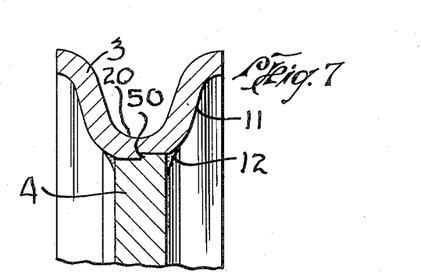
Fig. 7 is a broken detailed sectional view of a further modified form wherein the inner hub and web face construction of Fig. 5 has been applied to the outer web periphery and the inner rim periphery to insure the proper arrangement and positioning of the web and sheave rim.

Fig. 7 shows another modified arrangement of the outer periphery of the web 4 which provides for a stepped arrangement 50 which is quite similar to the stepped arrangement at 44 between the hub and the web.

Figure 8:
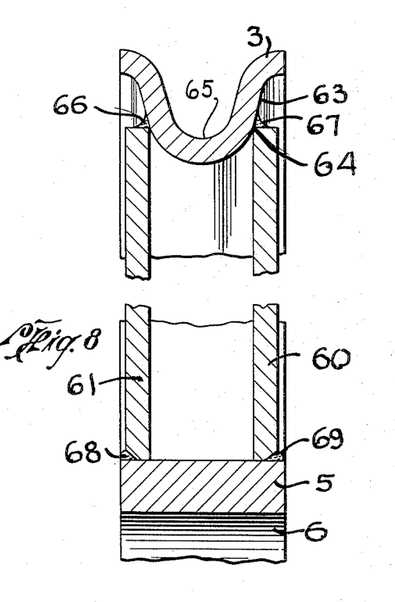
Fig. 8 shows still another modified arrangement of the device where a pair of spaced plates have been affixed to the hub and then the rim affixed at the outer circumferential peripheries of the plate so as to insure the proper positioning of the parts.

Fig. 8 shows a still further modified arrangement where the hub 5 and the rim 3 have been spaced apart by a pair of webs 4. These webs 60 and 61 are spaced apart substantially the length of the hub 5 so that the line of contact between the web and the inside surface 63 of the rim 3 will be at the line 64 substantially on a radius of the tread groove 65 so that the rim will be uniformly balanced and ordered when the weld metal 66 and 67 is positioned. The webs will be welded at 68 and 69 to the hub.

Figure 9:
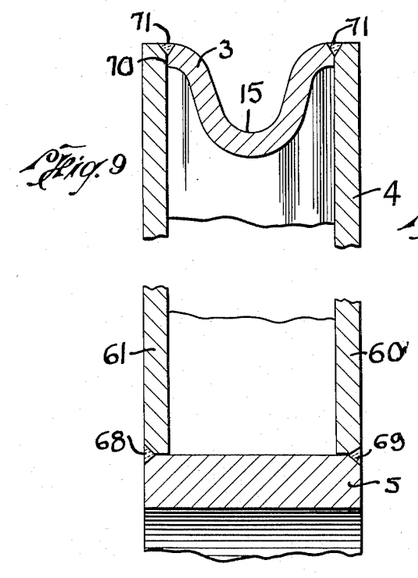
Fig. 9 is a sectional view somewhat similar to Fig. 8 but illustrating the rim as having been countersunk down in between the spaced plates with the plates affixed to the edges of the sheave rim.

Fig. 9 shows another modification of the structure which is quite similar to Fig. 8 except that the webs 60 and 61 will be of slightly larger circumference so as to abut against the edge 70 of the sheave rim 3 along the inner surface of the web and to be affixed thereto by the band weld metal 71 at each edge.

Figure 10:
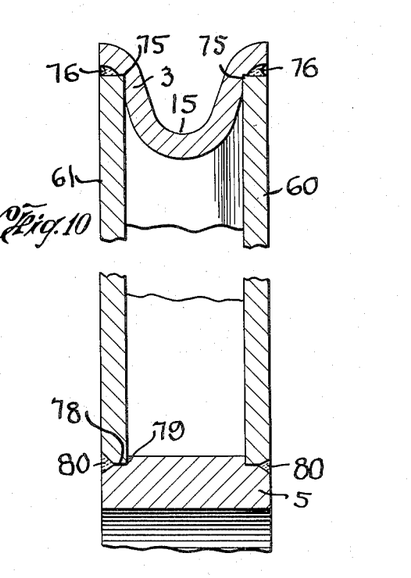
Fig. 10 shows another slightly modified form which is an intermediate construction as between the arrangement of Fig. 8 and Fig. 9.

Fig. 10 shows a still further modified arrangement where the webs 60 and 61 will fit into a groove 75 in each edge of the inner surface of the rim 3 and be affixed thereto by the beads of weld metal 76 so as to brace the sheave against spreading and properly support the parts. The inner peripheral opening 78 in each of the webs 60 and 61 is arranged to fit into the reduced groove 79 in the ends of the hub and to be there affixed by the weld metal at 80.

Figure 11:
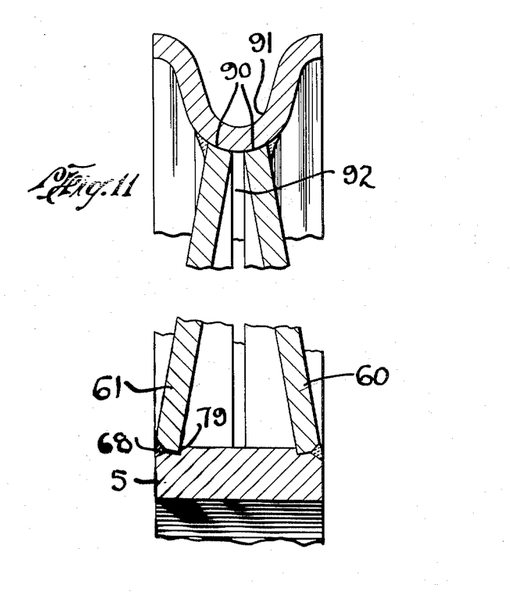
Fig. 11 shows a still further modified arrangement wherein a pair of spaced webs are inclined from the outer ends of the hub to a position closely adjacent each other under the groove of the sheave rim.

Fig. 11 shows a still further modified arrangement where the webs 60 and 61 will be inclined so as to extend from the outer ends of the hub 5 as previously described after having been deposited in the grooves 79 in such a manner that the two webs approach each other adjacent the base of the rim so that the contact points thereof at 90 will be directly beneath the tread or wire line groove 91 so as to provide a brace support for the tremendous loads of the wire line in the rim structure.

There may be a small space 92 between the plates where they bear against the base of the sheave.

While a number of modifications of the hub, rim, and web construction have been shown and described, it is to be understood that the various forms may modify one with the other and with respect to either the hub or the rim arrangement as may be justified by the particular circumstances encountered.

As shown in Fig. 1 the web 4 may have the lightening holes 93 and 94 therein it being pointed out that these holes should be symmetrically spaced about the axis of the sheave so that the sheave is both dynamically and statically balanced. In this regard it is pointed out that these lightening hole features are not limited to the modification shown in Fig. 1 but such may be provided in any or all modifications, it only being required that wherever employed the lightening holes should be so sized and spaced with relation to the axis of the sheave as to insure its static and dynamic balance.

Broadly, the invention contemplates an arrangement whereby: (1) the cross section of the sheave groove is uniform through its entire circumference; (2) the usual spoke construction is discarded in favor of a solid web plate, which may have lightening holes suitably spaced therein, attached to the hub so as to provide uniform homogeneous cross sections of material in the completed sheave; (3) the sheave will be inherently balanced both dynamically and statically; (4) the sheave rim will be manufactured from alloy steel which is heated at forging temperatures and roll-forged into its final cross sections in such a manner that the grain structure is circumferential of the sheave and the grain structure will be in the form of minute wires circumferentially disposed around the web plate to form the shape of the groove rim with axes of all the minute wires parallel and circumferential of the web plate; (5) the tread portion of the sheave is heat treated by a flame hardening process to provide a substantial Brinell hardness which results in long wear; (6) actual sheaves of a 48" diameter have been tested to carry tremendous loads, and smaller sheaves have been constructed to have inversely greater strength.

As sheaves formed as herein described by the method of fabrication do not have any shrink pockets or sand holes as appear almost invariably in cast sheaves, and wherein the stresses in the metal are relieved to avoid stress cracks, it follows that a sheave of substantially greater strength than the spoke type of sheave is provided to avoid deforming of the sheave rim by concentrated loads because the sheave rim is uniformly supported by a round web plate.

What is claimed is:

1. A method of fabricating a wire line sheave of a hub, web, and rim comprising, creating a rim of a flat strip of sheet metal of a predetermined length and width, squaring the ends thereof with the edges, rolling such strip into a circular rim, positioning the rim on edge on flat slab surface, temporarily affixing the rim to the surface so that all points of the same edge are in the same plane and with the rim as a cylinder, beveling the inside ends along the joint to form a groove penetrating substantially one half the thickness of the rim, welding such groove to create a homogeneous joint of the ends and weld metal, grooving the outer surface of the rim ends in to the inside weld metal, welding the outer groove to meet the inside weld so that the joint is a homogeneous band, having one hundred per cent weld penetration, grinding the weld to obtain a rim of uniform circumferential thickness, heating the rim by rotating the rim in a furnace having a revolving bottom to turn the rim and obtain an even heat thereon to stress relieve the metal of the rim, rolling the red hot rim between adjustable dies to roll forge the wire groove by such circumferential rolling to a predetermined setting of the roller dies to create a circumferential grain structure in the metal, a small stream of water is directed just in front of the groove forming die to momentarily cool the metal as it passes under the grooving die, the water cools the dies and pops off scale which may have formed, removing the grooved rim from the dies and positioning on edge on a flat slab to avoid bending or distortion because the rim is still hot and practically stress relieved, cutting an annular web plate from a flat sheet metal plate, fitting the outer peripheral edge of the web into the inner peripheral base of the rim so that the central plane of the rim and the central plane of the web are coincidental by heating the rim for expansion to pass over the web periphery, thus removing grain stresses, providing a sheave hub, fitting such hub into the web center opening, welding the hub and web and the web and rim, removing any scale from the rim groove, flame hardening the sheave tread groove to a Brinell hardness approximating 500, testing the groove for "go" or "no go" gage for correct profile, mounting the sheave in a boring mill centered in a jig fixture to clamp the sheave by the formed groove or tread, machining the sheave with reference to the root diameter of the tread groove and the bore of the hub normal to the root diameter.

2. A method of fabricating a wire line sheave comprising a hub, web, and rim, such method including the steps of, selecting a flat strip of sheet metal of a predetermined length, width, and thickness, rolling such strip into a substantially circular ring, connecting the ends of the ring together by means of a through weld, rolling the ring between adjustable dies to roll forge the wire receiving groove in the central region of the strip without substantially deforming the opposite side portions, which thereby constitute stiffening flanges on both sides of the central wire receiving groove, providing an annular web plate with a peripherally continuous outer edge and a central hub receiving opening, fitting the outer peripherally continuous edge of the web into the inner peripheral base of the sheave groove providing a sheave hub, fitting such hub into the web center opening, welding together the hub and the web and the peripherally continuous edge of the web and the inner peripheral base of the sheave groove and machining the edges of said stiffening flanges and the ends of the hub in balanced relation to the central plane of the sheave groove.

3. A method of forming a line sheave assembly, including squaring the opposite ends of a flat strip of sheet metal of predetermined length and width, bending the strip into a ring with the squared ends in abutment, permanently joining the abutting ends by a through weld having 100% weld penetration, heating and roll forging the central portion of the strip to deform the same into a peripherally open line receiving groove without substantial deformation of the side portions of the strip, which thus constitute laterally extending stiffening flanges for the line receiving groove, forming an annular web plate from flat sheet metal with a peripherally continuous outer edge whose outside diameter slightly exceeds the inside diameter of the base of said line receiving groove, and again applying heat to the ring to remove stress and to expand the same, and fitting it to the peripherally continuous edge of the web plate.

4. The method of forming a line sheave assembly, including circularly bending to annular ring shape a flat band of sheet metal strip stock, joining in end to end relation the opposite ends of said flat band, applying heat to the band for uniformly heating the same to a predetermined roll forging temperature and then continuously rotating the heated endless annular band against adjustable forging dies to deform the central annular region thereof to depressed open groove, final line receiving shape and without substantially deforming from their original shape the band portions in the regions along opposite edges, separately forming a central supporting disk structure having a peripherally continuous outer edge of a diameter slightly greater than the inside diameter of the forged band, applying heat to remove forging stress and to expand the band to a diameter greater than the disk outer diameter and fitting the same to said peripherally continuous outer edge and allowing the band to cool for a shrink fit to the disk on a circumferentially unbroken line of support, and finally machining the parts to true the same to predetermined standards.

References Cited in the file of this patent
UNITED STATES PATENTS

| | | |
|---|---|---|
| 421,669 | Case | Feb. 18, 1890 |
| 897,667 | Sharp | Sept. 1, 1908 |
| 903,532 | Anderson | Nov. 10, 1908 |
| 917,450 | Jones et al. | Apr. 6, 1909 |
| 1,413,051 | Michelin | Apr. 18, 1922 |
| 1,497,337 | Loguin | June 10, 1924 |
| 1,947,462 | Doorbar | Feb. 20, 1934 |
| 2,065,275 | Hester | Dec. 22, 1936 |
| 2,320,163 | Anderson | May 25, 1943 |